United States Patent
Pfaller et al.

(10) Patent No.: US 9,415,868 B2
(45) Date of Patent: Aug. 16, 2016

(54) ROTOR BLADE WITH CONTROL FLAP

(71) Applicant: AIRBUS HELICOPTERS DEUTSCHLAND GMBH, Donauworth (DE)

(72) Inventors: Rupert Pfaller, Riemerling (DE); Bernhard Enenkl, Bockhorn (DE)

(73) Assignee: Airbus Helicopters Deutschland GmbH, Donauworth (DE)

( * ) Notice: Subject to any disclaimer, the term of this patent is extended or adjusted under 35 U.S.C. 154(b) by 436 days.

(21) Appl. No.: 14/180,419

(22) Filed: Feb. 14, 2014

(65) Prior Publication Data

US 2014/0234104 A1 Aug. 21, 2014

(30) Foreign Application Priority Data

Feb. 20, 2013 (EP) .................................. 13400003

(51) Int. Cl.
*B64C 27/72* (2006.01)
*B64C 27/615* (2006.01)

(52) U.S. Cl.
CPC ............... *B64C 27/615* (2013.01); *B64C 27/72* (2013.01); *B64C 2027/7283* (2013.01); *Y02T 50/34* (2013.01)

(58) Field of Classification Search
CPC .............. B64C 2027/7283; B64C 2027/7261; B64C 2027/7266; B64C 2027/7294; B64C 2027/7277; B64C 2027/7272; B64C 2027/7288; B64C 27/72; B64C 3/50; B64C 9/16; B64C 9/18; B64C 9/20; B64C 9/22; B64C 9/24; B64C 9/26; B64C 9/28

See application file for complete search history.

(56) References Cited

U.S. PATENT DOCUMENTS

| | | | |
|---|---|---|---|
| 5,811,911 A | 9/1998 | Janker et al. | |
| 6,196,796 B1 | 3/2001 | Lozyniak et al. | |
| 6,295,006 B1 * | 9/2001 | Kohlhepp | B64C 27/001 244/17.11 |
| 6,644,919 B2 * | 11/2003 | Bauer | B64C 27/473 416/23 |
| 6,717,333 B2 | 4/2004 | Hermle et al. | |

(Continued)

FOREIGN PATENT DOCUMENTS

| | | |
|---|---|---|
| DE | 10017332 A1 | 10/2001 |
| EP | 1035015 A2 | 9/2000 |
| EP | 2514669 A1 | 10/2012 |

OTHER PUBLICATIONS

European Search Report; European patent application No. EP 13400003, dated Jul. 10, 2013.

*Primary Examiner* — Jason L Vaughan
(74) *Attorney, Agent, or Firm* — Brooks Kushman P.C.

(57) ABSTRACT

A rotor blade (1) with an exterior shell (20) extending in a span and chord wise direction and at least one control flap (4) extending in essentially span wise direction to said exterior shell (20). Load transmission means inside said blade chamber (7) comprise piling type housings (13) respectively with one actuator (8, 9), one flap drive (10, 11) and a longitudinal girder (15). Said at least one piling type housing (13) comprises at least one upper strap (14) and at least one lower strap (14) oriented essentially in said chord direction in between said longitudinal girder (15) on the one side and the support for said at least one actuator (8, 9) on the other side, each of said upper and lower straps (14) being symmetric aligned in chord direction relative to at least two pivot bearings (35, 36). Said upper and lower straps (14) are stiff in chord direction and flexible in span wise direction.

8 Claims, 3 Drawing Sheets

(56) References Cited

U.S. PATENT DOCUMENTS

| | | |
|---|---|---|
| 7,585,151 B2 * | 9/2009 | Lorin De La Grandmaison ....... B64C 27/615 416/24 |
| 7,878,459 B2 * | 2/2011 | Mabe ........................ B64C 9/32 244/213 |
| 8,328,134 B2 * | 12/2012 | Wagner ..................... B64C 9/16 244/99.2 |
| 9,180,966 B2 * | 11/2015 | Schank ................. B64C 27/615 |
| 2002/0071767 A1 | 6/2002 | Bauer et al. |
| 2002/0141867 A1 | 10/2002 | Preissler |

* cited by examiner

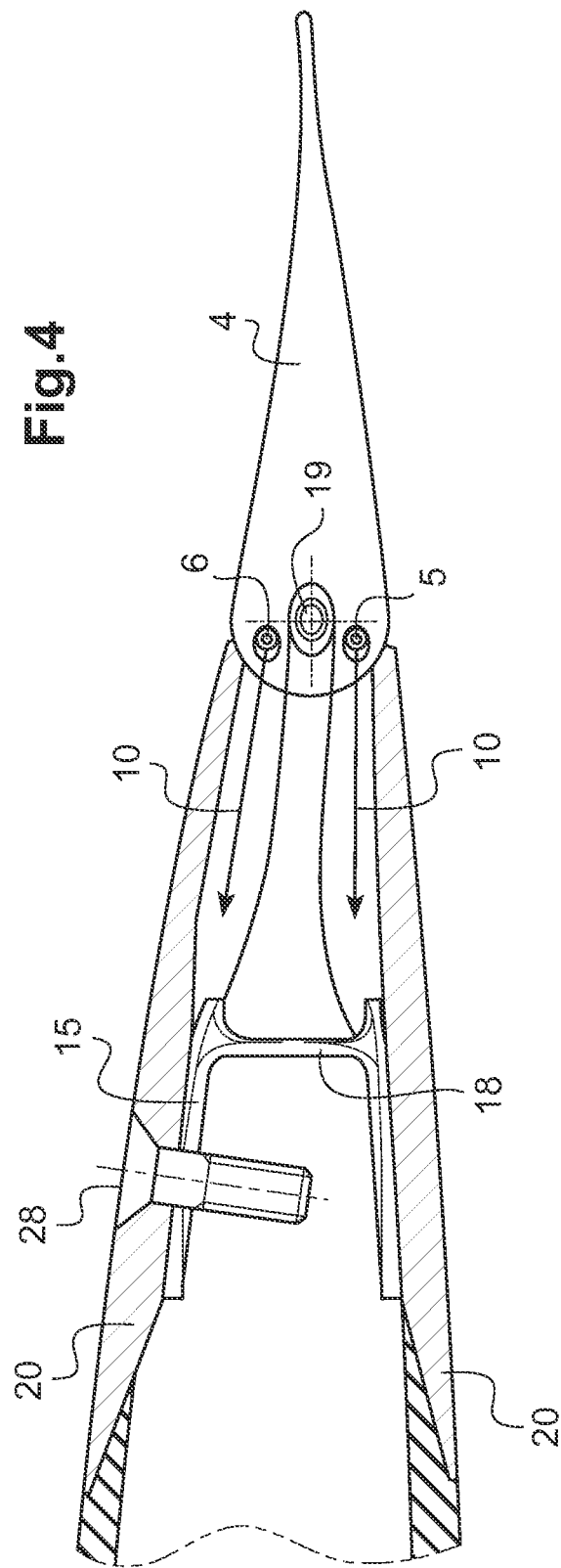

ROTOR BLADE WITH CONTROL FLAP

CROSS REFERENCE TO RELATED APPLICATION

This application claims priority to European patent application No. EP 13 400003.3 filed Feb. 20, 2013, the disclosure of which is incorporated in its entirety by reference herein.

BACKGROUND OF THE INVENTION (1) Field of the Invention

The invention is related to a rotor blade with at least one control flap with the features of the preamble of claim 1.

(2) Description of Related Art

The control flap is intended to enable individual blade control. For a rotor blade with a control flap an actuator is necessary to control the flap.

The document U.S. Pat. No. 5,811,911 discloses a piezoelectric actuator with at least two disk-shaped congruent bending elements which each have a carrier plate made of a hard-elastic material with a layer of a piezoelectric material applied to one or both sides. Two bending elements respectively are connected with one another by way of at least two bending joints arranged on the circumference of the carrier plates.

The document DE 100 17 332 A1 discloses a piezoelectric actuating device for controlling the flaps on the rotor blade of a helicopter. The device comprises a piezo element arrangement and a power transmission frame which is coupled therewith, is fixed to the rotor blade and generates a force between an abutment and a driven element by changing the length of the piezo element arrangement. Said force is effective crosswise in relation to the direction of the centrifugal force of the rotor blade.

The document US 2002/0071767 A1 discloses a rotor blade arrangement with a rotor blade, a hollow blade chamber therein, and a flap module removably arranged and secured in the blade chamber. The flap module includes a module housing received in the blade chamber, an actuator arranged in the housing, a flap pivotably arranged at an edge of the housing, and a power transmission linkage connecting the actuator to the flap. The flap may be a trailing edge flap at the trailing edge of the blade. The entire flap module can be easily removed from the blade for adjustment, inspection, maintenance, repair or replacement.

The document EP 2 514 669 A1 discloses a gurney-type flap assembly in which an actuator is connected to the flap via an actuator output and a yolk assembly.

In document U.S. Pat. No. 6,196,796 B1 there is an actuator which controls the flap by means of two supply lines (one used to move the flap upwards, the other to move it downwards) so that depending on which supply line is active certain lobes of a butterfly shaft pressurize or depressurize, thus controlling the torque exerted on the flap.

The document EP 1 035 015 A2 describes an actuator housed in a rotor blade. The actuator is in contact with four thin plates of a "displacement magnifying means—its contraction and expansion moves such plates, which in turn transmit this "magnified displacement" to the flap.

In document US 2002/0141867 A1, the actuator is connected to the flap by means of two parallel tension struts, both of them located in the plane in which the flap itself extends.

BRIEF SUMMARY OF THE INVENTION

It is an object of the invention to provide a lightweight rotor blade with at least one control flap with a load transfer to the control flap as efficient as possible.

The solution is provided with a rotor blade with at least one control flap with the features of claim 1 of the invention.

According to the invention a rotor blade with an exterior shell extending in a span and a chord wise direction has at least one control flap extending in essentially span wise direction to said exterior shell. The inventive rotor blade is preferably part of a main rotor of a helicopter. Said at least one control flap projects in an essentially chord wise direction beyond said exterior shell. At least one blade chamber inside said exterior shell is provided with a passage to said at least one control flap. At least one actuator inside said at least one blade chamber is provided with a flap drive connected essentially in said chord direction with said control flap via said at least one passage.

Load transmission means are provided to take up the reaction forces caused by said at least one actuator between said at least one actuator and said control flap. Said load transmission means comprise at least one piling type housing with one actuator inside and one flap drive oriented essentially in said chord wise direction. Said load transmission means further comprises a longitudinal girder being fixed to said exterior shell and extending longitudinally in said essentially span wise direction.

Said at least one piling type housing comprises a central support for said at least one actuator distal to said longitudinal girder. Said longitudinal girder comprises at least one or preferably two pivot bearings to support said at least one control flap. Next to the at least one or preferably two pivot bearings, i.e. preferable at the same area where straps of the piling type housing are fixed to the longitudinal girder, at least one bearing is provided on said at least one control flap for actuation of said at least one control flap by means of said at least one flap drive.

Preferably said at least one control flap comprises centrally between said at least two pivot bearings said at least one bearing on said at least one control flap. Withholding means with orientation essentially in said span wise direction are fixed at one end to said exterior shell and at the other end to said at least one actuator to carry any loads on the at least one actuator as pure tension, said loads resulting from rotation, i.e. centrifugal loads and/or lead lag acceleration of the inventive rotor blade and provide for low loads on the central support for said actuator in the piling type housing.

Said at least one piling type housing comprises at least one upper and at least one lower strap oriented essentially in said chord direction in between said longitudinal girder on the one side and the support for said at least one actuator on the other side the piling type housing, each of said upper and lower straps being symmetrical aligned in chord direction relative to said at least one pivot bearing of the inventive rotor blade. Said at least one upper and at least one lower strap or preferably pairs of upper and pairs of lower straps are stiff in chord direction and flexible in span wise direction.

The inventive rotor blade is lightweight and allows connection of an actuator with its associated control flap in a way that the load transfer from the actuator to the control flap and the reactions to the load transfer are via said at least one stiff piling type housing as effective as possible. The inventive rotor blade contains respectively one actuator and one flap drive within one piling type housing with in span wise direction flexible straps of the inventive rotor blade to allow a clear load path and not to overload the central support for said actuator in the piling type housing.

The central support of the actuator in the piling type housing allows the actuator to move the control flap, as the piling type housing is stiff in chord wise direction of the inventive rotor blade for transmission of any pull/push displacement of the actuator via the flap drive to the control flap with good efficiency. The piling type housing is fixed to the inventive rotor blade by means of a span wise longitudinal girder integral with the piling type housing and fixed to the external shell next to the control flap.

The clear load path in the piling type housing of the inventive rotor blade results from the alignments in chord wise direction of the central support for said at least one actuator, the associated flap drive with the bearing at said at least one pivot bearing and the respective alignments in chord wise direction of the straps of the piling type housing relative to said at least one pivot bearing.

The respective alignments provide for a substantially symmetric transmission of the actuation forces as push/pull forces from the actuator via the flap drive, the bearings and the longitudinal girder on the shortest possible way back directly into the straps for reaction at the central support for said actuator of the piling type housing of the inventive rotor blade.

As the piling type housing of the inventive rotor blade is free laterally outside the straps and at its crest distal from the longitudinal girder and as the longitudinal girder is fixed to the exterior shell, the piling type housing of the inventive rotor blade is essentially free of bending moments resulting from actuation forces for the control flap.

Any bending moments in the piling type housing of the inventive rotor blade resulting from centrifugal forces and or lead lag accelerations of the inventive rotor blade are kept low as the piling type housing of the inventive rotor blade is designed to yield to said bending moments by means of the in span wise direction flexible straps. The essentially low bending moments of the piling type housings of the inventive rotor blade allow for straps of the piling type housing with reduced cross sections and thus allow a lightweight inventive rotor blade with efficient actuation of its control flaps.

The inventive rotor blade allows a simple and light compensation of the length of a frame of the actuator under centrifugal load while providing stiff transmission of the actuating force on the shortest possible way from the frame of the actuator to the control flap by means of the straps with the advantage of avoiding waste of energy by deformation of load path structure.

According to a preferred embodiment of the invention a pair of the upper and a pair of the lower straps are provided, said straps being symmetric aligned in chord direction relative to at least two pivot bearings and said at least one actuator for a substantially symmetric transmission of the actuation forces essentially free of bending moments into the straps of the piling type housing of the inventive rotor blade.

According to a further preferred embodiment of the invention at least one fixation piling type housing inside said at least one blade chamber is separated from the straps and the crest of the piling type housing and oriented essentially parallel to said at least one piling type housing. Said at least one fixation piling type housing is as well integral with the longitudinal girder. Said at least one fixation piling type housing is fixed to said exterior shell of the inventive rotor blade. The fixation piling type housing allows pre fixation of the at least one actuator during assembly of the control flap to the inventive rotor blade.

According to a further preferred embodiment of the invention said control flap is a separate trailing edge control flap.

According to a further preferred embodiment of the invention said actuator is a piezoactuator.

According to a further preferred embodiment of the invention two actuators are provided inside said at least one blade chamber, each with a flap drive, said flap drives being connected essentially in chord direction to said control flap. One of the two actuators is arranged to rotate the control flap in clockwise direction out of the plane defined by the chord wise and the span wise direction, while the other one of the two actuators is arranged to rotate the control flap opposed to said clockwise direction.

According to a further preferred embodiment of the invention the straps of the at least one piling type housing are attached to said exterior shell in a way to prevent relative to the rotor blade profile perpendicular displacements of the straps but free in chord wise direction for further stiffening of the straps against buckling in a chord wise direction.

BRIEF DESCRIPTION OF THE SEVERAL VIEWS OF THE DRAWINGS

Preferred embodiments of the invention are described with reference to the following description and drawings.

FIG. 4 shows a cross sectional view of a section of the transmission means with a control flap of the helicopter's rotor blade according to the invention.

DETAILED DESCRIPTION OF THE INVENTION

Figure 1:
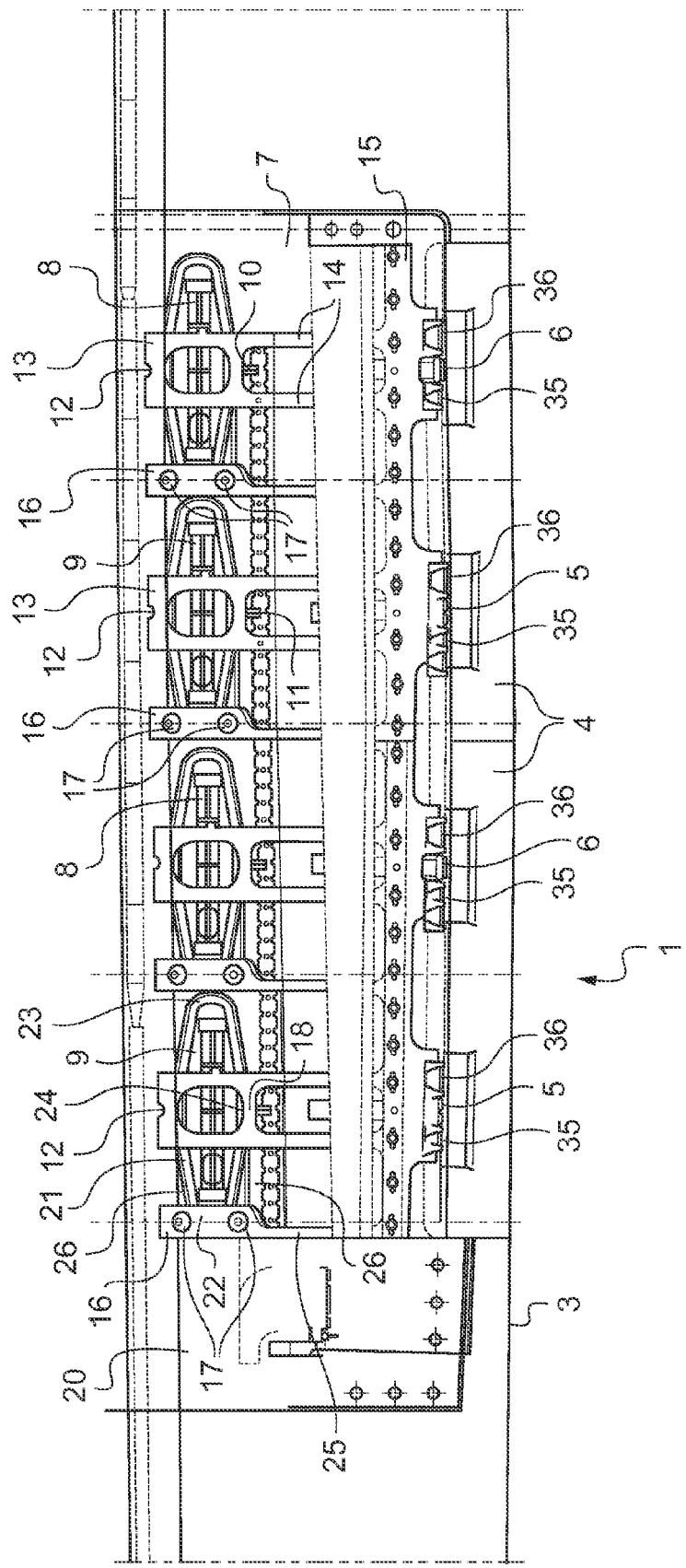
FIG. 1 shows a schematic top view of a partially cut open helicopter's rotor blade with control flaps according to the invention.
Figure 2:
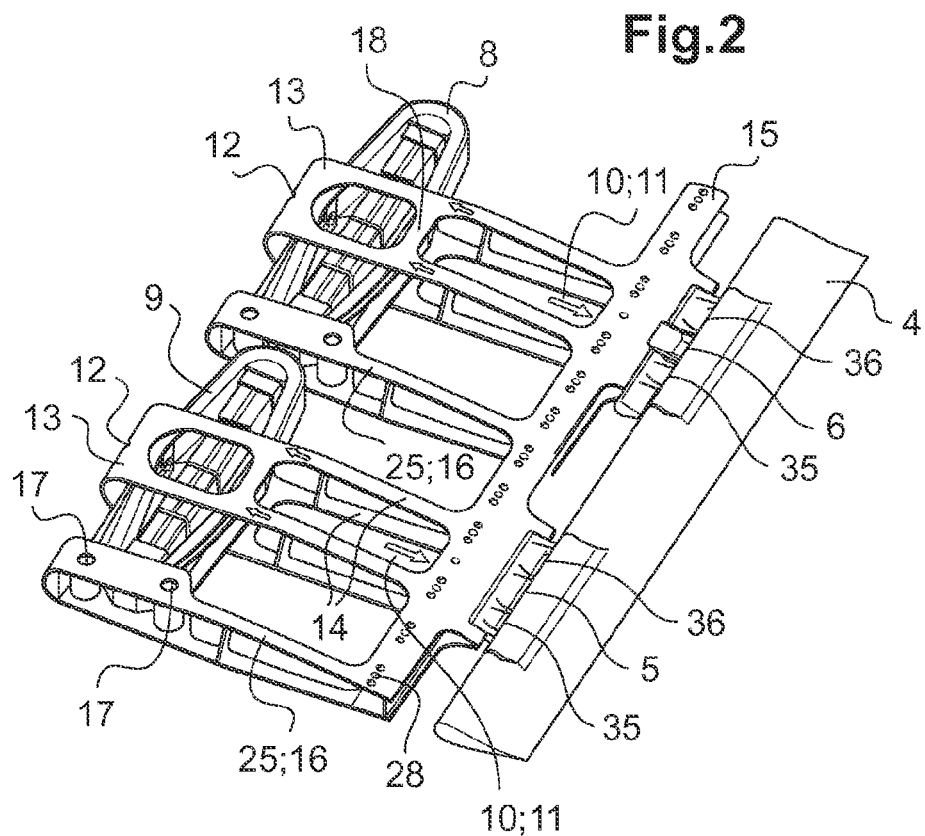
FIG. 2 shows a schematic overall view of actuators, flap drives, transmission means and control flaps of the helicopter's rotor blade according to the invention.
Figure 3:
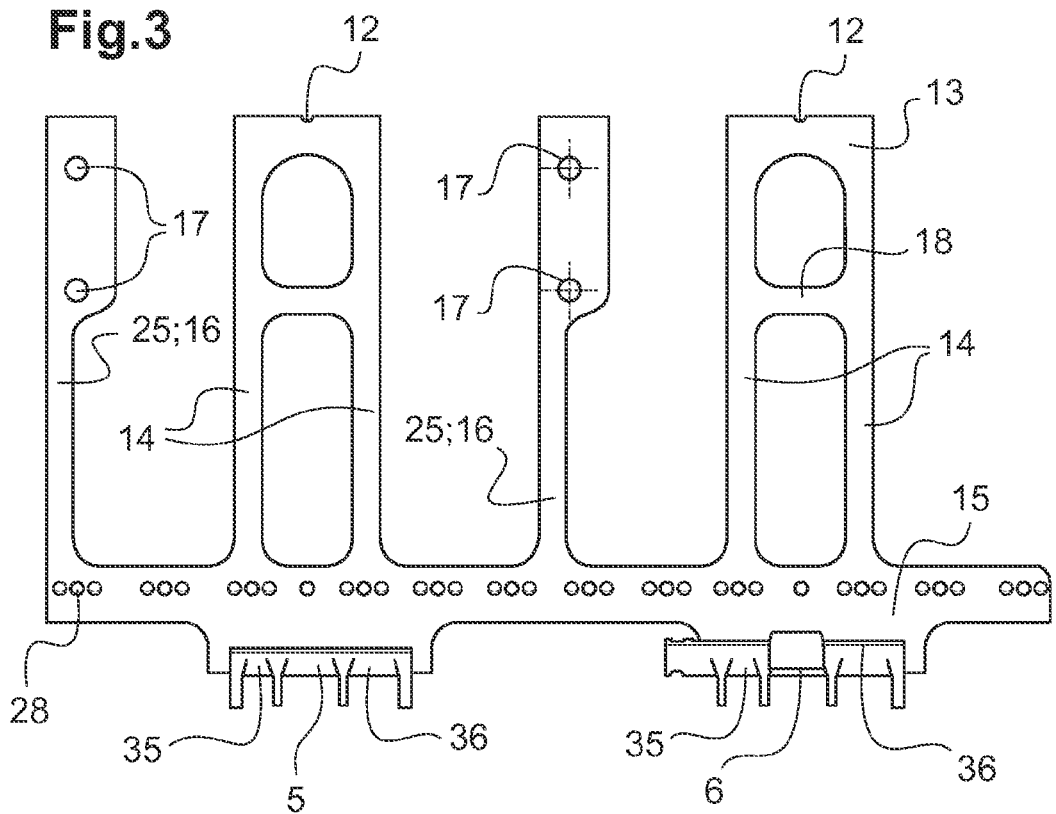
FIG. 3 shows a top view of the transmission means of FIG. 2.

According to FIGS. 1, 2 and 3 a helicopter's rotor blade 1 has an exterior shell 20 extending in a span wise direction and a chord wise direction perpendicular to said span wise direction of said rotor blade 1. A leading edge 2 and a trailing edge 3 of said rotor blade 1 extend each essentially along said span wise direction of said exterior shell 20. Two essentially longitudinal control flaps 4 are aligned in span wise direction along a part of the trailing edge 3 to project essentially in chord wise direction of the helicopter's rotor blade 1.

The rotor blade 1 has a blade chamber 7 inside the exterior shell 20 between the leading edge 2 and the trailing edge 3 and in span wise direction of said rotor blade 1 for accommodation of piling type housings 13 aligned in span wise direction. Each of the piling type housings 13 contains either an upward actuator 8 or a downward actuator 9, said actuators 8, 9 being arranged along the leading edge 2 of the rotor blade 1 for pivoting of a control flap 4 clockwise or counter clockwise relative to a plane defined by the span wise and chord wise direction at the trailing edge 3 of the helicopter's rotor blade 1.

Each piling type housing 13 comprises two in span wise direction separate upper straps 14 and two in span wise direction separate lower straps 14 extending all in essentially chord wise direction around the actuators 8, 9 to a longitudinal girder 15 along the control flaps 4 at the trailing edge 3. The upper straps 14 are essentially above and the lower straps 14 are essentially below the plane defined by the span wise and chord wise direction. At the leading edge 3 all of the two upper and the two lower straps 14 of one piling type housing 13 are interconnected by a crest of the piling type housing 13. Laterally outside of each piling type housing 13 and in chord wise direction from the longitudinal girder 15 the two upper and the two lower straps 14 are free in span wise direction. The longitudinal girder 15 is almost as long as the complete blade chamber 7 in chord wise direction.

Each of the respective actuators 8, 9 comprise a fiber reinforced rhombical type plastics housing 21. Each of said rhombical type plastics housings 21 is fixed symmetric in chord wise direction by respective fastening means 12 to said crest of one of the piling type housings 13. Said fastening means 12 are e.g. screws.

An upper flap drive 10 connects the upward actuator 8 with an upward bearing 6 and a lower flap drive 11 connects the downward actuator 9 with a downward bearing 5 of an associated control flap 4.

The control flaps 4 are mounted respectively by two pairs of pivot bearings 35, 36, allowing pivoting of said control flaps 4 around the trailing edge 3 out of a plane defined by said span and chord wise direction. One pair of pivot bearings 35, 36 is separate in span wise direction from the other pair of pivot bearings 35, 36 of said control flaps 4.

Each upward bearing 6 is situated above said plane defined by said span and chord wise direction and each upward bearing 6 is situated in the middle of two pivot bearings 35, 36 and each downward bearing 5 is situated below said plane defined by said span and chord wise direction and is situated in the middle of two further pivot bearings 35, 36. The respective distances of the pivot bearings 35, 36 from each other in span wise direction are determined by the dimensions of the respective upward bearings 6 or respective downward bearings 5.

The respective upward bearing 6 is essentially aligned in chord wise direction with the upper flap drive 10 and the respective fastening means 12 to said crest of the associated piling type housing 13 and the respective downward bearing 5 is essentially aligned in chord wise direction with the lower flap drive 11 and the respective fastening means 12 to said crest of the associated piling type housing 13. The two upper and the two lower straps 14 are essentially aligned in chord wise direction with the pivot bearings 35, 36, i.e. the distance in span wise direction between the two upper or the two lower straps 14 are respectively determined by the dimensions of the respective upward bearings 6 or the respective downward bearings 5. The respective widths of the flap drives 10, 11 correspond to the respective widths of the bearings 5, 6. The respective widths of the two upper and the two lower straps 14 correspond to or said widths are smaller than the respective widths of the pivot bearings 35, 36, i.e. the respective widths of the flap drives 10, 11 and the respective widths of the two upper and the two lower straps 14 are much less than the respective lengths of the flap drives 10, 11 and the respective lengths of the two upper and the two lower straps 14, with a ratio for width versus length<1:4.

The actuators 8, 9 are piezoactuators supported in the respective fiber reinforced rhombical type plastics housings 21. Said piezoactuators 8, 9 are essentially oriented in the span wise direction inside the respective rhombical type plastics housings 21 to be able to exert pressure to respectively opposed ends 22, 23 of the respective fiber reinforced rhombical type plastics housings 21 oriented in span wise direction. The piezoactuators 8, 9 have hinge-type opposed ends 22, 23.

By exerting pressure by means of the actuators 8, 9 to the respectively in span wise direction opposed ends 22, 23 of the respective fiber reinforced rhombical plastics housing, tension is applied to the respective flap drives 10, 11 fixed to a movable crest 24 of the respective fiber reinforced rhombical type plastics housing 21, said movable crest 24 being opposed in chord wise direction relative to the fixed crest at the respective fastening means 12. The respective disclosures in DE 100 17 332 A1 and/or DE 100 61 636 A1 regarding design of the actuators 8, 9 are included in the present application.

Each piling type housing 13 is connected via the longitudinal girder 15 to a fixation piling type housing 16 comprising a single upper and a single lower strap 25 interconnected at a further crest of the fixation piling type housing 16. The single upper and single lower straps 25 are essentially parallel to the two upper and two lower straps 14 of the piling type housing 13. The fixation piling type housing 16 is fixed by two further fastening means 17 to the exterior shell 20 of the rotor blade 1. Two fastening means 17 for the fixation piling type housing 16 are arranged in chord wise direction of the rotor blade 1. The upper and lower straps 25 of the fixation piling type housing 16 are stabilized by bars 27 connecting the upper to the lower strap 25.

Withholding means, e.g. strips 26, are provided with orientation essentially in said span wise direction. Each of the withholding means 26 is fixed with one end to one of said two further fastening means 17 and to said exterior shell 20 and/or said at least one fixation piling type housing 16. The other end of one of the withholding means 26 is attached to the crest of the piling type housing 13 and the other end of the other of the withholding means 26 is attached to the movable crest 24 of the respective fiber reinforced rhombical plastics housings of one of said actuators 8, 9. Two withholding means 26 support one of the piling type housings 13 against centrifugal forces of the rotor blade 1 in operation.

The longitudinal girder 15 is fixed by screws 28 along the trailing edge 3 to the exterior shell 20 of the rotor blade 1. The longitudinal girder 15 is integral with each of the pair wise straps 14 of the piling type housings 13 and with each of the single straps 25 of the fixation piling type housing 16. The pivot bearings 35, 36 of said control flaps 4 are mounted to the trailing edge 3 by means of the longitudinal girder 15.

In the first place the exterior shell 20 is open at the trailing edge 3 to allow insertion of the piling type housing 13 in chord wise direction of the rotor blade 1. Fixation of the longitudinal girder 15 by the screws 28 along the trailing edge 3 to the exterior shell 20 of the rotor blade 1 joins the exterior shell 20 of the rotor blade 1 with the piling type housing 13 to a closed cross section for an efficient transfer of torsion moments in the exterior shell 20 of the rotor blade 1, said torsion moments being caused mainly by aerodynamic loads of the rotor blade 1 in operation.

The straps 14, 25 of each of the piling type housings 13, 16 are made with carbon fibers, said carbon fibers being essentially oriented in chord wise direction.

Each control flap 4 is actuated via the flap drives 10, 11 and the bearings 5, 6 provided alongside the longitudinal girder 15. Forces from the flap drive 10 in chord wise direction to the control flap 4 due to actuation of the actuators 8, 9 are transferred into the two upper and the two lower straps 14 at the level of the longitudinal girder 15 and are further transmitted via the two upper and the two lower straps 14 into the piling type housing 13. The two upper and lower straps 14 of the piling type housing 13 are stabilized by bars 27 connecting the upper to the lower straps 14. The two upper and two lower straps 14 are respectively interconnected by in plane spacers 18. The two upper and two lower straps 14 are very stiff in chord wise direction, i.e. any ratios of actuating load displacements versus stiffness are such that the elongation of any of the straps 14 is less than 50% of the actuating load displacements.

According to FIG. 4 corresponding features are referred to with the references of FIGS. 1 to 3. The upper straps 14 and the lower straps 14 of the piling type housing 13, the longitudinal girder 15 and the bar 27 are fixed by means of screws

28 to the exterior shell 20 of the rotor blade 1. The downward actuator 9 is fixed to the piling type housing 13 by the fastening means 12.

The lower flap drive 11 connects the downward actuator 9 via a passage from said blade chamber 7 to said downward bearing 5 of the control flap 4 for pivoting of the control flap 4 relative to a pivoting axis 19.

Subsequent to actuating the actuator 9, the lower flap drive 11 is pulled towards the longitudinal girder 15 for downward pivoting of the control flap 4 relative to the pivoting axis 19 and the resulting reaction forces are transferred into the longitudinal girder 15 and then into the upper and lower straps 14 of the piling type housing 13 loaded in compression.

Further up in span wise direction of the rotor blade the same control flap 4 is connected to the upward actuator 8 via the upper flap drive 10 linked to the upward bearing 6 above the pivoting axis 19 of the control flap 4 for upward pivoting of the control flap 4 relative to the pivoting axis 19 (not shown).

With the fastening means 12, the respective movable crest 24 of each of the actuators 8, 9 the respective flap drives 10, 11 and the respective bearings 5, 6, all in line in chord wise direction, any loads of the piling type housing 13 resulting from lead lag accelerations of the rotor blade 1 and/or forces resulting from actuation of the actuators 8, 9 are essentially in chord wise direction.

With the loads resulting from lead lag accelerations of the rotor blade 1 and/or forces resulting from actuation of the actuators 8, 9, all essentially in chord wise direction and the straps 14 in line in chord wise direction with the respectively associated pivot bearings 35, 36, all of the loads are essentially along the straps 14.

Any centrifugal loads on the actuators 8, 9 resulting from operation of the rotor blade 1 are carried by the withholding means 26 orientated essentially in said span wise direction of the rotor blade 1. Any centrifugal loads on the piling type housings 13, 16 resulting from operation of the rotor blade 1 are carried by the longitudinal girder 15 fixed to the exterior shell 20 of the rotor blade 1.

Thus each piling type housing 13 is essentially free from bending moments resulting from operation of the control flaps 4 and/or resulting from operation of the rotor blade 1. Any movements of one of the piling type housing 13 in span wise direction due to deformations of the associated actuator 8, 9 in operation are compensated at low stresses along the relatively long and in span wise direction flexible straps 14, said flexibility being determined by the ratio<¼ for width versus length of said straps 14. Any of said movements of one of the piling type housing 13 in span wise direction due to deformations of the associated actuator 8, 9 in operation do not substantially misalign the straps 14 in chord wise direction relative to the respectively associated pivot bearings 35, 36.

LIST OF REFERENCES

1 rotor blade
2 leading edge
3 trailing edge
4 control flap
5 bearing
6 bearing
7 blade chamber
8 upward actuator
9 downward actuator
10 upper flap drive
11 lower flap drive
12 fastening means
13 piling type housing
14 straps
15 longitudinal girder
16 fixation piling type housing
17 screws
18 in plane spacers
19 pivot axis
20 exterior shell
21 plastics housings
22 opposed end
23 end
24 movable crest
25 upper and lower strap
26 strips
27 bar
28 screw
35 pivot bearing
36 pivot bearing

What is claimed is:

1. A rotor blade with an exterior shell extending in a span and chord wise direction and at least one control flap extending in essentially span wise direction to said exterior shell, particularly a rotor blade with an exterior shell extending in a span and chord wise direction and at least one control flap extending in essentially span wise direction to said exterior shell for a main rotor of a helicopter, said at least one control flap projecting in an essentially chord wise direction beyond said exterior shell, said rotor blade comprising:

at least one blade chamber inside said exterior shell and at least one passage from said at least one blade chamber to said at least one control flap;

load transmission means in said at least one blade chamber, said load transmission means comprising at least one piling type housing respectively with one actuator, one flap drive and a longitudinal girder, said at least one piling type housing supporting centrally said one actuator distal to said longitudinal girder, said flap drive being oriented essentially in said chord direction and being in driving connection with said actuator and said at least one control flap, said longitudinal girder being fixed to said exterior shell and extending longitudinally in said essentially span wise direction, at least one pivot bearing mounted to said longitudinal girder to support said at least one control flap;

at least one bearing at said at least one control flap for connection of said at least one control flap to said at least one flap drive; and withholding means for each actuator with orientation essentially in said span wise direction, said withholding means being respectively fixed at one end to said exterior shell and at another end to each actuator, wherein said at least one piling type housing comprises at least one upper strap and at least one lower strap oriented essentially in said chord direction in between said longitudinal girder on one side and the support for said at least one actuator on another side, each of said upper and lower straps being aligned in chord direction relative to said at least one pivot bearing and said at least one actuator, and said upper and lower straps being stiff in chord direction and flexible in span wise direction.

2. The rotor blade according to claim 1, wherein a pair of upper and a pair of lower straps are provided, said straps being symmetric aligned in chord direction relative to at least two pivot bearings and said at least one actuator.

3. The rotor blade according to claim 1, wherein at least one fixation piling type housing inside said at least one blade chamber is oriented essentially parallel to said at least one piling type housing, said at least one fixation piling type housing being integral with the longitudinal girder on the one side and being fixed to said exterior shell on the other side.

4. The rotor blade according to claim 3, wherein the withholding means with orientation essentially in said span wise direction are fixed to said at least one fixation piling type housing.

5. The rotor blade according to claim 1, wherein said support for said at least one actuator is provided by fastening means oriented essentially in said chord direction in line with said at least one flap drive and said at least one bearing.

6. The rotor blade according to claim 1, wherein said control flap is a separate trailing edge control flap.

7. The rotor blade according to claim 1, wherein said actuator is a piezoactuator.

8. The rotor blade according to claim 1, wherein two actuators are provided for each control flap.

* * * * *